Aug. 24, 1926.

N. D. FISHER 1,597,029

VALVE SPRING RETAINER

Filed July 25, 1925

INVENTOR.
Norman D. Fisher,
BY
Frank A. Cutter,
ATTORNEY.

Patented Aug. 24, 1926.

1,597,029

UNITED STATES PATENT OFFICE.

NORMAN D. FISHER, OF SPRINGFIELD, MASSACHUSETTS.

VALVE-SPRING RETAINER.

Application filed July 25, 1925. Serial No. 45,990.

My invention relates to improvements in retainers or locks for the valve springs of internal-combustion engines, and consists essentially of jaws of peculiar construction, which are adapted to engage and release the stem of a valve, and when engaged with said stem to support the valve spring at the bottom, holding the same under compression, together with a split-ring to prevent said jaws from becoming entirely separated when not in place on said stem, all as hereinafter set forth.

The primary object of my invention is to provide a comparatively inexpensive device for retaining a valve spring in place without danger of accidental displacement, and which is simple both in construction and operation, so that it can be easily and quickly placed in position and as easily and quickly removed, the removal being necessary whenever said spring has to be released or unlocked to enable the valve to be taken out for regrinding or other purposes.

A further object is to provide a valve-spring retainer that becomes automatically locked to the valve stem, when said retainer is forced into place beneath said spring, and with which a simple tool or implement, as a screw-driver, is all that is required to effect the unlocking of said retainer for the removal of the same and the release of the spring.

Other objects and advantages will appear in the course of the following description.

I attain the objects and secure the advantages of my invention by the means illustrated in the accompanying drawings, in which—

Figure 1:
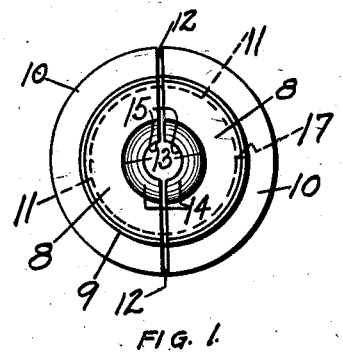
Figure 2:
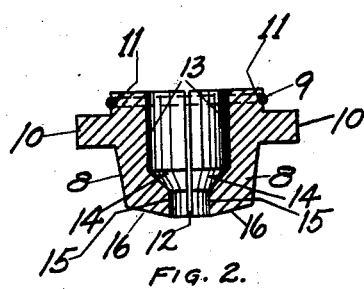
Figure 3:
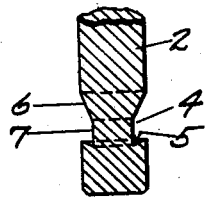

Figure 1 is a top plan of a valve-spring retainer which embodies a practical form of my invention; Fig. 2, a central vertical section through said retainer; Fig. 3, a sectional detail of the lower terminal of a valve stem, showing the groove therein which is needed for the accommodation of said jaws, and, Fig. 4, a side elevation of a valve and stem and of the retainer locked to said stem, with a spring interposed between said valve and retainer.

Similar reference characters designate similar parts throughout the several views.

Figure 4:
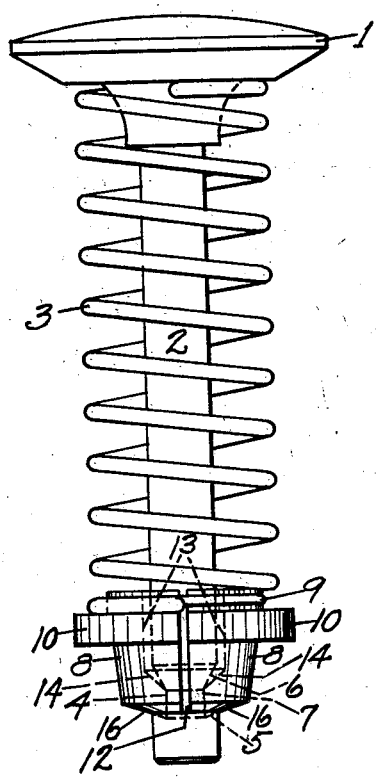

In Fig. 4, I show an ordinary valve 1 with its stem 2, and a spring 3, such as is commonly employed, to hold said valve in closed position on its seat, the latter not being represented.

The stem 2 differs from the ordinary valve stem only in that said first-named stem is provided at the lower terminal with an engaging element or medium, such as a part which has therein an annular groove 4. The stem at the bottom of the groove 4 is cupped or depressed inside of the outer rim thereof, as clearly shown at 5 in Fig. 3. The upper portion of the grooved part of the stem 2 is conical, as best shown at 6, and the connecting portion between said last-named portion and the aforesaid bottom of the groove is cylindrical, as best shown at 7, in Fig. 3.

The retainer, which operates or acts in conjunction with the grooved valve stem 2, comprises a pair of jaws 8 and a split-ring 9. A short distance below the tops of the jaws 8 said jaws are provided with exterior flanges 10—10, and the parts of said jaws which are above said flanges are exteriorly grooved, as at 11—11, to receive the split-ring 9. This split-ring is resilient, and of a size and shape to fit partially within the grooves 11, and, when in said grooves, normally to remain therein and thus prevent the jaws from becoming entirely separated when they are off of the valve stem 2. The split-ring is capable of yielding, however, while still in the grooves 11, and thus of enabling said jaws to be separated far enough to receive the stem 2 between them. Oppositely disposed gaps 12 between the jaws 8, of greater or less width, may, therefore, be present at all times.

The jaws 8, may be positioned with their inner faces substantially parallel and spaced apart, and then they have a circular formation in plan, although such formation is incomplete because said jaws are separated by the gaps 12. The inner faces of the jaws 8 are formed in the upper portion to correspond in a general way with the major diameter of the valve stem 2, and in the lower portion to receive the conical portion 6 and the diminished cylindrical portion 7 of the grooved part of this stem, as represented respectively at 13, 14—14, and 15—15, while the bottoms of said jaws are tapered, as shown at 16—16, to fit into the inclined bottom 5 of the groove 4. The parts 15 are really curved hooks or fingers with which to engage the grooved part of the stem 2. The upper portions of the recesses 13 in the jaws 8, when the latter are separated to the extent permitted by the unexpanded split-ring 9, approximate in diameter the major diameter of the stem 2. But the jaws may be widely separated at the bottom, the gap 12 at the lower end then being greatly increased in width, and the sides of said gaps relatively diverging from above downwardly. When the jaws are thus opened wide, they are sufficiently separated at the bottom to clear the valve stem at any point, and the device can be attached to or removed from said stem.

The joint in the split-ring 9 is shown at 17 in Fig. 1. The split-ring 9 is forced on over the tops of the jaws 8 into the grooves 11, and may be forced out of said grooves and off of said jaws, should occasion require. The jaws are not, therefore, permanently connected by the split-ring, but when inactive are loosely connected by the same. The split-ring performs no office so far as the real functions of the jaws are concerned; it is merely an auxiliary member provided as a convenient means for preventing the jaws from becoming entirely separated when not in use.

To assemble the parts and place the retainer in position, slip the spring 3 up under the valve 1 and around the stem 2, and place the retainer beneath said spring, with the latter bearing on the flanges 10, at the same time inserting the base of said stem in the opening at 13, unless the spring shall be too long when in extended or expanded condition to permit this to be done. In the latter event the base of the stem 2 will enter the opening at 13 and in between the jaws 8 when the retainer is elevated. A lifter (not shown) is now applied beneath the retainer, and arranged with its arms crosswise of the gaps 12. By means of the lifter the retainer is elevated against the resiliency of the spring 3, and as said retainer rises the base of the stem 2 contacts with the tapered portions 14 of the jaws 8 and forces the latter apart, against the resiliency of the split-ring 9, to an extent sufficient to enable the fingers 15 to pass up to the groove 4. As soon as the fingers 15 arrive at the groove 4, the spring 3 acts to close the jaws 8 and thrust said fingers into said groove. Upon the removal of the lifter, the force of the spring 3 continues to be exerted on the jaws 8, and the latter are caused to interlock with the grooved portion of the stem 2, the engagement between the parts being of such a character, due to the pressure of the spring 3 from above which has a constant tendency to force the fingers 15 tightly into contact with the bottom 5 of the groove 4 and the diminished portion 7 of the stem, that said spring is securely and amply supported at the bottom under compression, and there is no liability that the supporting members will become accidentally disconnected or detached.

When it is desired to release the spring 3 for any purpose, it is simply necessary to apply the lifter to the retainer, taking care this time to locate the arms of said lifter beneath the jaws 8 on opposite sides of the gaps 12, and raise the parts sufficiently to lift the fingers 15 from their seat in the bottom 5 of the groove 4, and then to pry open said jaws by inserting an implement in said gaps from either direction, and while the jaws are thus open to permit the retainer to descend until said fingers are clear of the groove 4. The parts are now loose and any of them can be removed without difficulty.

This retainer not only possesses the advantages hereinbefore pointed out, but it is also very strong and durable as will be readily seen.

I am aware that various means have been employed for retaining or locking valve springs under compression, and that means of this character have been provided which are automatic in their unlocking or disengaging action, but none possesses the advantages of or is constructed in a manner similar to my retainer.

More or less change in minor details of construction may be made in this device without departing from the spirit of my invention or exceeding the scope of what is claimed.

What I claim as my invention, and desire to secure by Letters Patent, is—

1. The combination, in a device of the class described, with a valve stem having an engaging element, of a pair of members provided with integral flanges to receive thereon the base of a valve spring, which members are capable of automatically interlocking with said engaging element when forced upwardly on said stem against the resiliency of said spring, and a split-ring loosely connecting said jaws.

2. The combination, in a device of the class described, with a valve stem having near the lower end thereof a groove the bottom of which is cupped, of resiliently-connected jaws provided with projecting parts at their upper terminals to support a valve spring, and further provided at their lower terminals with fingers to enter the groove in said stem when said jaws are forced upwardly on the stem, and to rest on said cupped bottom when the jaws are released to the action of said spring.

3. The combination, in a device of the class described, with a grooved valve stem, of jaws having at the bottom fingers to engage the grooved part of said stem, and near the top flanges to support a valve spring under compression, said jaws having tapered parts which cause said fingers to be opened when pressure from above is applied to said tapered parts.

4. The combination, in a device of the class described, with a grooved valve stem, of grooved jaws having supporting members for a valve spring, the grooves in said jaws being above said supporting members, and fingers to engage the grooved part of said stem, said jaws being adapted to receive between them said stem, and a split-ring in said grooves, the arrangement and construction of parts being such that said fingers automatically engage said grooved part of the stem when said jaws are thrust upwardly thereon against said spring, and may be disengaged from said grooved part by the application of an implement in the space between said jaws.

NORMAN D. FISHER.